Oct. 31, 1961 C. C. PIERCE 3,006,690
AUTOMATIC WHEEL BALANCING DEVICE
Filed Nov. 3, 1959
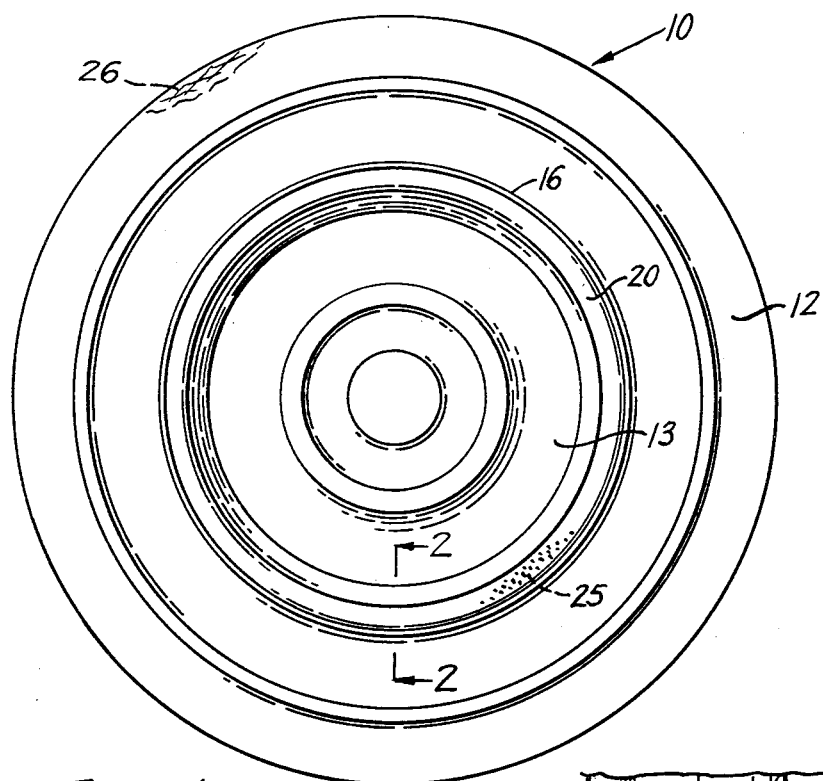
FIG. 1
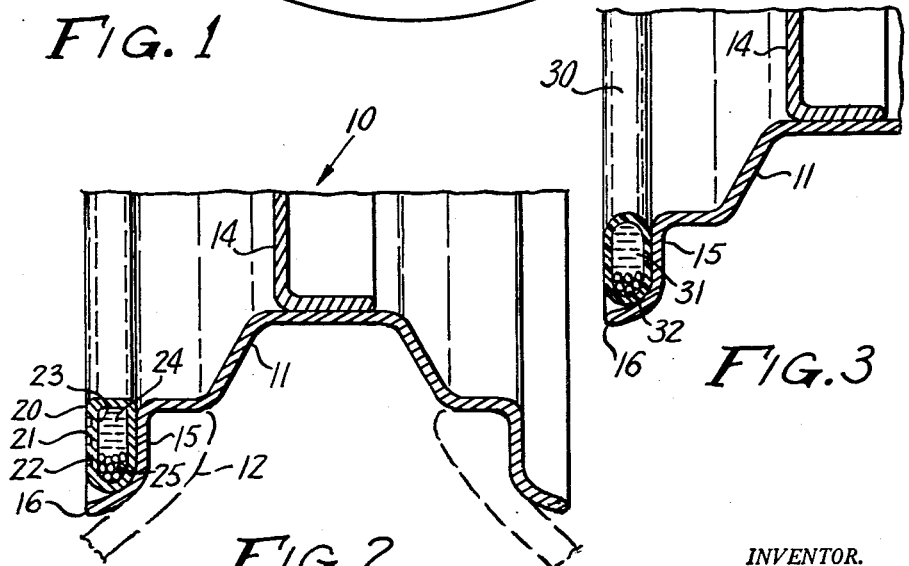
FIG. 2
FIG. 3
INVENTOR.
COMER C. PIERCE
BY
Kimmel & Crowell
ATTORNEYS 3,006,690
AUTOMATIC WHEEL BALANCING DEVICE
Comer C. Pierce, 537 Riverside Ave., Jacksonville 2, Fla., assignor of forty-nine percent to Comer C. Pierce, Jr., Jacksonville, Fla.
Filed Nov. 3, 1959, Ser. No. 850,665
1 Claim. (Cl. 301—5)

This invention relates to an automatic wheel balancing device, and has as its primary object the provision of a device which is adapted to be attached to the wheel of a vehicle which will automatically compensate for uneven tire wear, unbalanced tire construction, recapped tires, objects picked up in travel along the highway, or other conditions creating an unbalance in a tire.

A further object of the invention is the provision of such a device which may be readily attached to either the inside or the outside of any wheel of any conventional vehicle.

An additional object of the invention is the provision of such a device which compensates for the above mentioned conditions automatically, as the vehicle is in motion, by centrifugal force.

An additional object of the invention is the provision of such a device which is highly ornamental in appearance, and will enhance the appearance of the vehicle wheel while at the same time serving its primary function.

Still another object of the invention is the provision of such a device which may be either constructed as an integral wheel unit in factory construction, or which may be readily attached to any existing wheel.

Still other objects reside in the combinations of elements, arrangements of parts, and features of construction, all as will be more fully pointed out hereinafter and disclosed in the accompanying drawing wherein there are shown preferred embodiments of this inventive concept.

In the drawing:

FIGURE 1 is a side elevational view of one form of automatic wheel balancer constructed in accordance with the invention shown as applied to a vehicle wheel;

FIGURE 2 is an enlarged sectional view taken substantially along the line 2—2 of FIGURE 1;

FIGURE 3 is a fragmentary sectional view similar to FIGURE 2 but showing a modified form of construction.

Similar reference characters refer to similar parts throughout the several views of the drawing.

Having reference now to the drawings in detail, there is generally indicated at 10 a vehicle wheel, which includes a rim 11 which has mounted thereon a tire 12, of any desired conventional type. The wheel is provided with a hub cap 13 which covers the conventional wheel hub (not shown) and wheel flange 14. The rim 11 includes the usual annular rim 15, with its outwardly curved edge forming flange 16. In its preferred forms, the device of the instant invention comprises a tubular annulus 20, which is preferably comprised of a material such as plastic or extruded aluminum, and which may be substantially oval in cross-section as shown in FIG. 3 or which, as shown in FIG. 2, may include a straight outer wall 21, which may be provided with decorative grooves 22, or the like. The outer wall 21 is adapted to seat flush with the outer edge of flange 16 extended, in order to enhance the appearance of the device, and at the same time provide a relatively smooth stream-lined effect.

In its preferred form the annulus 20 is positioned on the outside of the wheel, although if desired it may for reasons of tire or wheel construction be positioned on the inside thereof. The annulus 20 contains an annular interior cavity 23 extending entirely about the periphery thereof, which is partially or completely filled with a viscous fluid 24, such as mineral oil or the like. Suitably positioned in the mineral oil, and freely movable therein, is a quantity of aggregate, which may comprise small particles, such as shot or similar steel or lead pellets, as indicated at 25. The arrangement is such that the aggregate tends to float freely within the viscous material, and when a heavy spot, such as shown at 26 in FIGURE 1, throws the tire out of balance when the wheel rotates, centrifugal force tends to force the aggregate to concentrate on the side of the wheel diametrically opposite the point of unbalance in a quantity sufficient to correct the unbalance. Any quantity in excess of that necessary to effect such a correction is evenly distributed throughout the balance of the periphery of the annulus.

FIGURE 3 discloses a slightly modified form of device wherein a plain annular tube 30 is adapted to be affixed in the same position as annulus 20, the tube 30 containing a viscous fluid 31 and similar aggregate particles 32, the operation of this form of device being substantially identical to that previously discussed. Annuli 20 and 30 may be secured to the wheel rim in any desired manner, although preferably a suitable adhesive having the characteristics of suitably bonding metal-to-metal or plastic-to-metal is employed.

From the foregoing it will now be seen that there is herein provided an automatic wheel balancing device which accomplishes all of the objects of this invention, and others, including many advantages of great practical utility and commercial importance.

As many embodiments may be made of this inventive concept, and as many modifications may be made in the embodiments hereinbefore shown and described, it is to be understood that all matter herein is to be interpreted merely as illustrative, and not in a limiting sense.

I claim:

An automatically effective wheel balancing attachment for a vehicle wheel of the type having a rim with a tire mounted thereon, said rim having a substantially vertical outer wall portion and an annularly disposed outwardly extending flange portion, the intersection of said wall portion and said flange portion forming a bight; said attachment comprising a plastic annulus having a substantially oval cross section with a substantially straight outer wall, a plastic to metal adhesive permanently securing said annulus in said bight with said straight outer wall substantially flush with the outer edge of said flange, said annulus having an annular centrally disposed concentric chamber therein, mineral oil of relatively heavy viscosity substantially filling said chamber, and a quantity of freely movable individual lead shot particles dispersed in said mineral oil, whereby upon rotation of said wheel during normal travel said shot is gradually so dispersed in said mineral oil by centrifugal force as to assume a position wherein the effective weight of said shot is disposed diametrically opposite any heavy spots in the tire and wheel assembly occasioned by wear or damage, to counterbalance such spots and establish a dynamic balance of said wheel, the viscosity of said mineral oil and its complete filling of the interior of said chamber and the gradual disposal of the shot occasioned thereby precluding sudden weight shifts due to any sudden impact against the tire and consequent sharply fluctuating imbalance.

References Cited in the file of this patent

UNITED STATES PATENTS

| | | |
|---|---|---|
| 1,314,005 | Louden | Aug. 26, 1919 |
| 2,485,936 | Stroberg | Oct. 25, 1949 |
| 2,687,918 | Bell et al. | Aug. 31, 1954 |
| 2,737,420 | Wilborn | Mar. 6, 1956 |